US009115228B2

(12) United States Patent
Welsh et al.

(10) Patent No.: US 9,115,228 B2
(45) Date of Patent: Aug. 25, 2015

(54) STYRENIC RESIN HAVING IMPROVED EXTENSIONAL VISCOSITY

(75) Inventors: Gary C. Welsh, Cincinnati, OH (US); Jason R. Vititoe, Ashland, KY (US); Daron J. Kleppe, Oakdale, CT (US); Jason J. Miller, Marietta, OH (US)

(73) Assignee: Americas Styrenics, LLC, The Woodlands, TX (US)

( * ) Notice: Subject to any disclaimer, the term of this patent is extended or adjusted under 35 U.S.C. 154(b) by 326 days.

(21) Appl. No.: 13/571,156

(22) Filed: Aug. 9, 2012

(65) Prior Publication Data
US 2014/0045961 A1 Feb. 13, 2014

(51) Int. Cl.
C08F 8/00 (2006.01)
C08F 12/08 (2006.01)
C08F 12/06 (2006.01)

(52) U.S. Cl.
CPC .............. C08F 12/08 (2013.01); C08F 12/06 (2013.01); C08J 2325/04 (2013.01); C08J 2325/06 (2013.01)

(58) Field of Classification Search
CPC ........ C08F 12/08; C08F 2/06; C08J 2325/04; C08J 2325/06
USPC .................... 526/72, 346; 525/241
See application file for complete search history.

(56) References Cited

U.S. PATENT DOCUMENTS

| 3,144,420 | A | 8/1964 | Fryling |
| 3,563,870 | A | 2/1971 | Tung et al. |
| 3,563,879 | A | 2/1971 | Richards |
| 4,136,142 | A | 1/1979 | Hargreaves et al. |
| 4,263,420 | A | 4/1981 | Bracke |
| 4,404,300 | A | 9/1983 | Koski et al. |
| 4,525,257 | A | 6/1985 | Kurtz et al. |
| 4,585,825 | A | 4/1986 | Wesselmann |
| 4,668,725 | A | 5/1987 | Broussard et al. |
| 4,742,741 | A | 5/1988 | Hallberg et al. |
| 4,857,587 | A | 8/1989 | Sosa et al. |
| 4,927,690 | A | 5/1990 | Welsh |
| 4,952,627 | A | 8/1990 | Morita et al. |
| 5,060,870 | A | 10/1991 | Trezek et al. |
| 5,104,903 | A | 4/1992 | Hahn et al. |
| 5,116,881 | A | 5/1992 | Park et al. |
| 5,180,751 | A | 1/1993 | Park et al. |
| 5,191,040 | A | 3/1993 | Okumura et al. |
| 5,197,678 | A | 3/1993 | Trezek et al. |
| 5,250,577 | A | 10/1993 | Welsh |
| 5,256,732 | A | 10/1993 | Morita et al. |
| 5,266,605 | A | 11/1993 | Welsh |
| 5,269,948 | A | 12/1993 | Krutchen |
| 5,317,965 | A | 6/1994 | Wildes et al. |
| 5,340,844 | A | 8/1994 | Welsh et al. |
| 5,428,106 | A | 6/1995 | Schrader et al. |
| 5,502,263 | A | 3/1996 | Ponsford et al. |
| 5,629,076 | A | 5/1997 | Fukasawa et al. |
| 5,763,551 | A | 6/1998 | Wunsch et al. |
| 5,824,709 | A | 10/1998 | Suka |
| 6,031,142 | A | 2/2000 | Ponsford et al. |
| 6,054,540 | A | 4/2000 | Chaudhary et al. |
| 6,093,781 | A | 7/2000 | Demirors et al. |
| 6,117,918 | A | 9/2000 | Chaudhary et al. |
| 6,169,121 | B1 | 1/2001 | Noguchi et al. |
| 6,355,754 | B1 | 3/2002 | Olson et al. |
| 6,355,757 | B2 | 3/2002 | Garcia-Franco et al. |
| 6,362,270 | B1 | 3/2002 | Chaudhary et al. |
| 6,391,998 | B1 | 5/2002 | Garcia-Franco et al. |
| 6,414,047 | B1 | 7/2002 | Abe |
| 6,500,872 | B1 | 12/2002 | Noguchi et al. |
| 6,544,450 | B2 | 4/2003 | Welsh et al. |
| 6,545,090 | B1 | 4/2003 | Demirors et al. |
| 6,716,914 | B2 | 4/2004 | Malwitz et al. |
| 6,794,419 | B2 | 9/2004 | Suzuki |
| 7,781,552 | B2 | 8/2010 | Ebara |
| 7,947,749 | B2 | 5/2011 | Hasegawa et al. |
| 7,964,675 | B2 | 6/2011 | Ko et al. |
| 8,242,212 | B2 | 8/2012 | Grossetete et al. |
| 8,383,751 | B2 * | 2/2013 | Wang et al. ................... 526/320 |
| 2002/0006975 | A1 | 1/2002 | Welsh et al. |
| 2002/0103267 | A1 | 8/2002 | Suzuki |
| 2004/0014827 | A1 | 1/2004 | Suzuki |
| 2004/0157968 | A1 | 8/2004 | Marston et al. |
| 2005/0027555 | A1 | 2/2005 | Forrest et al. |
| 2005/0101735 | A1 | 5/2005 | Marston et al. |
| 2005/0150919 | A1 | 7/2005 | Jevens et al. |
| 2006/0106121 | A1 | 5/2006 | Seki et al. |

(Continued)

FOREIGN PATENT DOCUMENTS

| DE | 202005020234 | 3/2006 |
| EP | 2399719 | 12/2011 |
| GB | 2074591 A | 11/1981 |
| JP | 06080712 A * | 3/1994 |
| JP | 2002121316 | 4/2002 |
| JP | 2002265663 | 9/2002 |
| JP | 2004142235 | 5/2004 |
| KR | 0139068 | 5/1998 |
| KR | 20000011874 | 2/2000 |
| KR | 20030069008 | 8/2003 |
| KR | 20030076043 | 9/2003 |
| KR | 20090028749 | 3/2009 |
| KR | 2010-0079682 A | 7/2010 |
| KR | 20100134489 | 12/2010 |
| TW | 539736 | 7/2003 |
| WO | WO0029470 | 5/2000 |
| WO | WO03011956 | 2/2003 |
| WO | WO03094064 | 11/2003 |
| WO | WO2009064452 | 5/2009 |
| WO | PCT/US13/54372 | 8/2013 |

OTHER PUBLICATIONS

International Search Report for International Application No. PCT/US2013/054372 dated Nov. 2, 2013; 10 pgs.
U.S. Appl. No. 13/571,152, filed Aug. 9, 2012, Jack M. Frost.
Cazes "A Question of Molecular Weight," Waters Associates from Office Action mailed Apr. 30, 2013 for U.S. Appl. No. 13/571,152.
Moore, Styrene Polymers.1989, pp. 21-58, 193-205, 230-240.

Primary Examiner — Irina S Zemel
(74) Attorney, Agent, or Firm — Fletcher Yoder, P.C.

(57) ABSTRACT

The extensional viscosity of a styrenic resin is enhanced by increasing the Z+1 average molecular weight (Mz+1) of the resin. In one embodiment, an enhanced extensional viscosity resin is provided that has an Mz+1 molecular weight of at least approximately 745,000 and an extensional viscosity having a minimum value of approximately 360,000 Pascal-seconds (Pa-sec).

14 Claims, 1 Drawing Sheet

(56) References Cited

U.S. PATENT DOCUMENTS

| | | |
|---|---|---|
| 2006/0199873 A1 | 9/2006 | Mahta et al. |
| 2009/0098357 A1 | 4/2009 | Bergtold et al. |
| 2009/0143537 A1 | 6/2009 | Schneider et al. |
| 2010/0227987 A1 | 9/2010 | Ito et al. |
| 2011/0245428 A1 | 10/2011 | Grossetete et al. |
| 2012/0053255 A1 | 3/2012 | Koerner et al. |

* cited by examiner

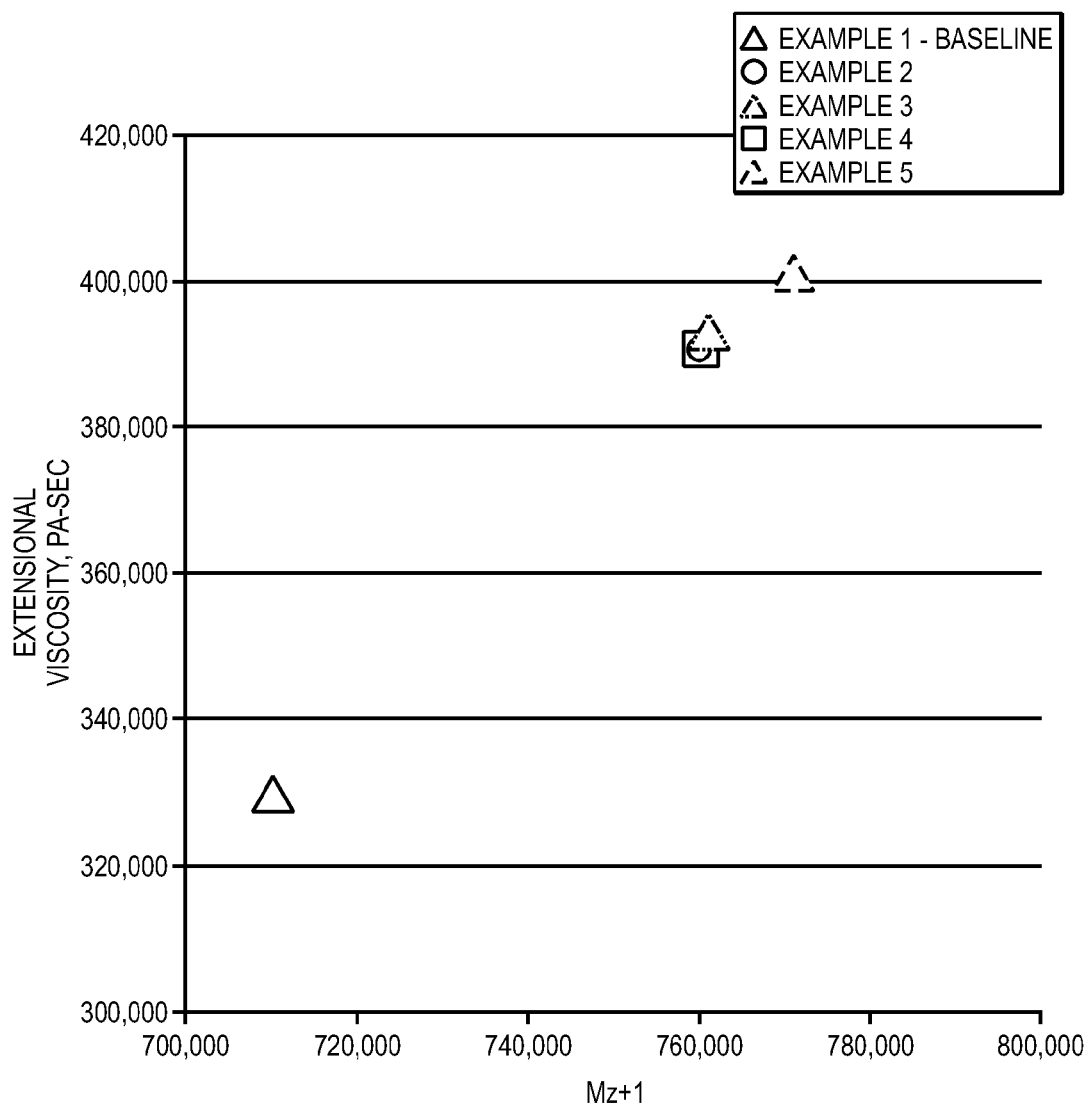

STYRENIC RESIN HAVING IMPROVED EXTENSIONAL VISCOSITY

BACKGROUND

The present disclosure relates generally to styrenic resin compositions and methods for preparing the same. More specifically, the present disclosure relates to styrenic resins having improved extensional viscosities.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Markets for certain products, such as articles made from polymeric materials, have benefitted from improved techniques for producing such materials. For example, improvements in techniques for polymerizing monovinylarene monomers to produce styrenic resins, such as improved yields, increased polymerization efficiencies, and/or improved properties of the styrenic resin, have led to styrenic resins being used in a wide variety of everyday applications. High impact polystyrene (HIPS) and crystal/general purpose polystyrene (GPPS), for instance, are styrenic resins that are presently used in a wide variety of products including medical devices, food packaging, food service articles, beverage containers, toys, appliances, jewel cases (e.g., for compact or digital video discs), and electronics.

In some GPPS applications, particularly food service, food packaging and large appliances, a sheet of a styrenic resin is extruded and subsequently thermoformed into a useful shape. In certain processes, the sheet may be a foamed sheet. An article (e.g., a disposable cup) may be cut out of the thermoformed shape. For economic considerations, the removed portion of thermoformed shape is typically reprocessed back into the extrusion process. The additional shear and heat history placed on the styrenic resin as a result of this reprocessing causes a certain degree of chain scission of the styrenic polymer chains. The reprocessed resin will therefore possess a lower molecular weight compared to the starting virgin resin. This lower molecular weight results in a variety of undesirable characteristics in the final part such as poor sidewall distribution in a thermoformed part; low sheet orientation and poor toughness in oriented film and sheet applications; and high open cell content, low orientation, and poor toughness in foam sheet structures and thermoformed articles.

The above characteristics are generally related to the extensional viscosity (EV) of a given styrenic resin. The EV of a resin is a measure of the viscosity coefficient of the resin when an extensional stress is applied. In other words, EV is the viscosity of stretching. Generally, as the EV of a resin increases, the undesirable characteristics mentioned above may be mitigated by enabling higher degrees of chain entanglement and chain orientation. Accordingly, it would be advantageous if the EV of styrenic resins could be increased to produce more consistent, better quality, and lighter weight parts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one aspect, the present disclosure provides a styrenic resin having an enhanced extensional viscosity (EV) obtained by increasing the Z+1 average molecular weight (Mz+1) of the resin. The Z+1 average molecular weight generally places a larger emphasis on longer polymer chains (e.g., higher molecular weight linear chains). Therefore, a resin having a relatively high Mz+1 will generally have a relatively large population of long chains. The Z+1 average molecular weight is generally defined according to equation (1) below:

$$M_{Z+1} = \frac{\sum n_i M_i^4}{\sum n_i M_i^3} \quad (1)$$

where $M_i$ is the molecular weight of a given chain and $n_i$ is the number of chains having the particular molecular weight. In accordance with an embodiment, the enhanced EV styrenic resin has an Mz+1 of at least approximately 745,000 a.m.u. (atomic mass units) as measured by gel permeation chromatography (GPC) and an extensional viscosity having a minimum value of 360,000 Pascal-seconds (Pa-sec) when measured on an extensional rheometer at a temperature of approximately 172° C. and 0.3 seconds with an extension rate of 10 sec$^{-1}$.

In another aspect, the present disclosure provides articles of manufacture produced using the enhanced extensional viscosity styrenic resins. The articles of manufacture may include, by way of non-limiting example, foamed articles, extruded sheets or films, blown or cast films, or any combination thereof.

In another aspect, the present disclosure provides compositions incorporating the enhanced EV styrenic resin. The composition may include the enhanced EV styrenic resin having an Mz+1 molecular weight with a minimum value of approximately 745,000 and an extensional viscosity having a minimum value of 360,000 Pascal-seconds (Pa-sec). Additionally, the composition may incorporate various other resin materials, including but not limited to post-consumer recycle (PCR) polystyrenes, rubber-modified or high impact polystyrene (HIPS) resins, polyolefins, and the like. Other materials that may be incorporated into these compositions include colorants, antioxidants, mold release agents, anti-blocking agents, plasticizers, or any combination thereof.

In a further aspect, the present disclosure provides embodiments of styrenic resins produced by generating virgin styrenic resin having improved EV in the presence of PCR polystyrenes. For example, a styrenic resin may include between approximately 50 weight percent and 90 weight percent virgin styrenic resin, the virgin styrenic resin having an Mz+1 of at least approximately 745,000. The styrenic resin may also include between approximately 10 and 25 weight percent or approximately 25 and 50 weight percent PCR polystyrene. In such embodiments, when the styrenic resin includes between approximately 10 and 25 weight percent PCR polystyrene, the styrenic resin has an extensional viscosity of at least approximately 293,000 Pascal-seconds (Pa-sec), and when the styrenic resin comprises between approximately 25 and 50 weight percent PCR polystyrene, the extensional viscosity is at least approximately 245,000 Pa-sec.

BRIEF DESCRIPTION OF THE DRAWINGS

Various aspects of this disclosure may be better understood upon reading the following detailed description and upon reference to the drawings in which:

FIG. 1 is a plot of extensional viscosity obtained as a function of changing Z+1 average molecular weight for a series of example styrenic resins, in accordance with an aspect of the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As set forth above, it would be advantageous if the extensional viscosity (EV) of a styrenic resin could be increased to produce more consistent, lighter weight, and tougher parts. To produce a styrenic resin with a relatively high EV, one approach might be to produce a styrenic resin with a relatively high weight average molecular weight (Mw), or to produce a styrenic resin with relatively high amounts of branching in the styrenic polymer chains. Unfortunately, such approaches can be costly, can result in poor processability, and, in some situations, can result in difficulties in obtaining regulatory approval for certain applications, such as food contact applications. Further, only increasing the Mw of a resin may not necessarily be sufficient so as to enhance the EV of a resin.

Indeed, while the physical properties, such as toughness, of styrenic polymers generally improve as the weight average molecular weight increases, processability can be negatively affected. Accordingly, it should be appreciated that there is a delicate balance between obtaining desirable physical properties in a styrenic resin while maintaining adequate processability. One measure of processability is the melt flow rate (MFR) of a resin. Typically, MFR values between 0.5 g/10 minutes to 4 g/10 minutes are desirable, with higher values typically enabling better processing but resulting in poor quality parts. Generally, a resin with a MFR of below 2.5 g/10 minutes may be desirable.

Thus, it is now recognized that it would be desirable to produce a styrenic resin having improved EV while maintaining adequate processability. In accordance with present embodiments, such high EV values and good processability may be obtained by producing styrenic resins having a large population of relatively high molecular weight (e.g., long) chains. In particular, it is now recognized that producing a styrenic resin having a higher Z+1 molecular weight (Mz+1) value compared to a baseline resin (e.g., a typical resin) will enhance the EV of the styrenic resin. Indeed, the inventors have found, surprisingly, that increasing Mz+1 by 1% results in a 2.5% increase in EV. Thus, a modest increase in Mz+1 can be made which results in a significant response in EV. In addition, adequate processability may be maintained, even at high EV values.

As discussed in detail below, the present disclosure provides styrenic resins, referred to as enhanced EV styrenic resins, having relatively high Mz+1 values, relatively high EV values, and suitable MFR values. Such improved properties coupled with adequate processability may enable the styrenic resins produced according to the present disclosure to be utilized in a number of processes including sheet extrusion, foaming, and injection molding applications. In addition, enhanced EV styrenic resins produced according to the present disclosure may enable the use of relatively large amounts of in-plant regrind in the production of various articles of manufacture. Further, enhanced EV styrenic resins produced in accordance with present embodiments may also serve as a virgin styrenic material that may be utilized in combination with post-consumer recycle (PCR) polystyrene to offset the typically poor properties associated with the PCR polystyrene. Indeed, the present enhanced EV styrenic resins may also serve as a source of high quality recycled material for eventual incorporation into a recycled article.

I. Properties of the Enhanced EV Styrenic Resin

In one aspect of the present disclosure, enhanced EV styrenic resins are provided that may generally have Mz+1 values of at least approximately 745,000. By way of non-limiting example, the present enhanced EV styrenic resins may have Mz+1 values between approximately 750,000 and 820,000, between approximately 760,000 and 810,000, or between approximately 770,000 and 800,000 as determined by gel permeation chromatographic (GPC) techniques. By way of non-limiting example, the Mz+1 value may be measured according to ASTM D-5296-11, including the methods described in U.S. Pat. Nos. 4,585,825, 5,191,040, 6,545,090, all of which are incorporated by reference herein in their entirety for all purposes. Again, such relatively high Mz+1 values may result in relatively high EV values.

Indeed, the enhanced EV styrenic resins may have an extensional viscosity having a minimum value of 360,000 Pascal-seconds (Pa-sec). By way of non-limiting example, the enhanced EV styrenic resins may have an extensional viscosity of between approximately 360,000 Pa-sec and 450,000 Pa-sec, between approximately 370,000 Pa-sec and 440,000 Pa-sec, or between approximately 380,000 Pa-sec and 430,000 Pa-sec when measured on an extensional rheometer at a temperature of approximately 172° C. and an extension rate of 10 sec$^{-1}$, with the reading being taken at 0.3 seconds. Unless specifically stated otherwise, extensional viscosities discussed herein are measured in this manner.

The enhanced EV styrenic resins produced in accordance with the present disclosure include the advantageous physical properties such as enhanced EV while also maintaining adequate processability for a wide variety of applications. Generally, the melt flow rate (MFR) of the present enhanced EV styrenic resins will be between approximately 0.5 g/10 min and 4.0 g/10 min, such as less than approximately 3.0 g/10 min, less than approximately 2.5 g/10 min, or less than approximately 2.0 g/10 min. By way of non-limiting example, the enhanced EV styrenic resins may have a MFR of between approximately 0.7 g/10 min and 2.5 g/10 min, between approximately 0.8 g/10 min and 2.0 g/10 min, or between approximately 0.9 and 1.5 g/10 min. In certain embodiments, the MFR of the enhanced EV styrenic resins may be between approximately 1.0 g/10 min and 1.2 g/10 min. Unless noted otherwise, all values for MFR are quoted as obtained per ASTM D-1238-10 (200° C., 5 kg load).

The enhanced EV of the present styrenic resin may, in certain embodiments, be a result of the linearity of the styrenic polymer chains constituting the styrenic resin. For example, while any degree of linearity and branching in the enhanced EV styrenic resin is presently contemplated, a greater degree of linearity may be desired to enhance the relative degree of chain entanglement and orientation. For example, in one embodiment, higher degrees of alignment between styrenic polymer chains may be obtained when the chains are linear. Accordingly, linear styrenic polymer chains produced in accordance with the present disclosure will constitute between approximately 50 and 100 weight percent, between approximately 65 and 100 weight percent, or between approximately 75 and 100 weight percent of the monomers used to produce the enhanced EV styrenic resin, based on the total weight of the monomers. Indeed, in certain embodiments, enhanced EV styrenic resins produced in accordance with the present disclosure may include less than approximately 10 weight percent branched monomeric units, less than approximately 5 weight percent branched monomeric units, or less than 1 weight percent branched monomeric units, based on the total weight of the monomers used to produce the styrenic resin. In one embodiment, the styrenic resins may be substantially free of branched monomeric units. That is, the enhanced EV styrenic resins may consist essentially of linear chains. Techniques for measuring the degree of linearity of styrenic resins will be readily apparent to those of ordinary skill in the art. By way of non-limiting example, the degree of linearity may be measured by low (or small) angle light scattering, kinetics measurements, or spectrometry (e.g., nuclear magnetic resonance (NMR) spectrometry).

II. Producing the Enhanced EV Styrenic Resin

The enhanced EV styrenic resins of the present disclosure are generally produced by polymerizing a monovinylarene monomer by bulk or solution free-radical polymerization, by anionic polymerization, or by suspension polymerization. Example methods for such polymerization are described in U.S. Pat. Nos. 6,117,918, 6,093,781, and 5,428,106, which are herein incorporated by reference in their entirety for all purposes. By way of non-limiting example, the polymerization process may be a free-radical solution polymerization process in which a chemical initiator initiates polymerization of the monovinylarene monomer. However, in some embodiments, the polymerization of the monovinylarene monomer may be thermally initiated or photoinitiated. It should be noted that in certain embodiments, other monomers including olefins, conjugated dienes, or the like, may be utilized as comonomers in addition to the monovinylarene monomer.

"Monovinylarene monomer," as used herein, refers to an organic component containing a single carbon-carbon double bond and at least one aromatic moiety. By way of non-limiting example, the monovinylarene monomer used to produce the present enhanced EV styrenic resins may include a total of 8 to 18 carbon atoms, such as 8 to 12 carbon atoms. Example monovinylarene monomers include, but are not limited to, alkyl-substituted styrenes such as α-alkylstyrenes (for example, α-methylstyrene and α-ethylstyrene), ring-substituted styrenes (for example, 2,4-dimethylstyrene; o-ethylstyrene, t-butyl-styrene, vinyltoluene and particularly p-vinyltoluene), ring-substituted halostyrenes such as chlorostyrene and 2,4-dichlorostyrene, styrene substituted with both a halo and alkyl group, such as 2-chloro-4-methylstyrene, vinyl anthracene, and mixtures thereof. In one embodiment, the monovinylarene monomer is styrene.

The chemical initiators used to initiate polymerization of the monovinylarene monomers may include a free-radical peroxide and/or azo-based initiator. In certain embodiments, multifunctional initiators may be desirable for enhancing chain length while maintaining linearity of the styrenic chains. Suitable peroxide initiators include benzoyl peroxide, t-butyl 2-methylperbenzoate, di-t-butyl peroxide, di(2-ethylhexyl) peroxydicarbonate, t-amyl peroctoate, t-butyl peroxybenzoate, t-butyl peroxyacetate, t-butyl peroxyoctoate, dibenzoyl peroxide, dilauroyl peroxide, 1,1-bis(t-butylperoxy)cyclohexane, 1-3-bis t-butylperoxy-(3,3,5-trimethyl cyclohexane), di-cumyl peroxide, polyesther poly-t-butylperoxycarbonate, di-t-butyl diperoxyazelate, and the like. Suitable azo initiators include 2,2'-azobis(isobutyronitrile) (AIBN), 2,2'-azobis(2,4-dimethylvaleronitrile), 1,1'-azobis (cyclohexanebarbonitrile), and the like. Photochemical initiation techniques can be employed if desired.

The initiators may be employed in a range of concentrations dependent on a variety of factors including the specific initiators employed, the desired levels of polymerization, desired levels of branching, and the conditions at which the mass polymerization is conducted. Specifically, initiators may be employed in amounts between approximately 0 and 2000 parts by weight per million parts by weight (ppm) of the monovinylarene monomer, such as between approximately 10 and 1000 ppm, or between approximately 50 and 500 ppm.

In embodiments where the enhanced EV styrenic resin is produced via a solution-based free-radical polymerization, the polymerization process may utilize a hydrocarbon solvent. Acceptable solvents include normally liquid organic materials that form a solution with the monovinylarene monomer and the styrenic resin prepared therefrom. Representative solvents include aromatic and substituted aromatic hydrocarbons such as ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Particularly suitable solvents include substituted aromatics, with ethylbenzene, toluene, and xylene being particularly useful.

In general, the solvent is employed in amounts sufficient to improve the processability and heat transfer during polymerization, and also to dissolve the monovinylarene monomer, certain additives, and other reaction components. Such amounts will vary depending on the monovinylarene monomer and solvent employed, the process equipment, and the desired degree of polymerization. If employed, the solvent is generally used in an amount of up to about 35 weight percent, preferably from about 2 to about 25 weight percent, based on the total weight of the solution.

The polymerization of the monovinylarene monomer (and any comonomers present) may also be conducted in the presence of one or more additives. For example, plasticizers (e.g. mineral oil), flow promoters, lubricants, antioxidants, initiators, mold release agents, color enhancers, and/or polymerization aids such as chain transfer agents (e.g., alkyl mercaptans such as n-dodecyl mercaptan, terpenes, alkyl and aryl halides, and alkyl aromatics) may be incorporated into the polymerization process. The particular additive compounds utilized, as well as their respective amounts, will be readily apparent to those of ordinary skill in the art and are within the scope of the present disclosure.

The temperature at which the polymerization process is conducted may vary according to a number of factors, including the desired rate of polymerization, the half-life of the chemical initiator employed for the polymerization process at different temperatures, and the like. Generally, the temperature will vary from about 60° C. to about 190° C. By way of non-limiting example, the polymerization process may be conducted at a temperature of between approximately 100° C. and 150° C.

The polymerization process may be conducted in any type of suitable polymerization reactor. For example, one or more reactors may be employed operating in a series configuration, parallel configuration, or any suitable configuration. Further, the reactor may be operable so as to enable adjustment of agitation rates, temperature ranges, feed rates, and so on, to achieve desired production rates and resin properties such as Mz+1. By way of non-limiting example, the polymerization process may be conducted in one or more continuous stirred tank reactors (CSTR), stirred tower reactors, axially segregated horizontal reactors, pipe reactors, and the like. In one embodiment, the process may be conducted in a stirred tank reactor.

For solution-based free-radical polymerization of the monovinylarene monomer, it should be noted that the concentrations of the polymerization components (e.g., monovinylarene monomer, initiator) in the solvent, the temperature or temperature profile at which the polymerization process is conducted, agitation rates, and so forth, may all affect the rate at which the styrenic resin is produced. In certain embodiments, the rate of polymerization may directly affect the Mz+1 obtained for a particular styrenic resin. For example, in one embodiment, slower polymerization rates may generally produce longer styrenic polymer chains, resulting in an increase in Mz+1. However, longer styrenic polymer chains can also significantly reduce the processability of the styrenic resin. Because the MFR is related to the melting and processing of the resin, an acceptable melt flow rate should be maintained. In addition, the overall production rate of the polymerization process should be maintained to provide acceptable economics of resin production. Thus, the rate of polymerization of the monovinylarene monomer may be controlled so as to increase Mz+1 while balancing the MFR and overall production rate.

After polymerization, the polymerized mixture may be subsequently processed to isolate the enhanced EV styrenic resin and form the enhanced EV styrenic resin into pellets, granules, or the like. For example, the polymerized mixture may be devolatilized (e.g., in a flash vessel under vacuum) to remove un-reacted monomer and solvent. Such devolatilization will typically be performed at adequate temperatures and pressures so as to remove substantially all unreacted monomer and solvent.

III. Incorporating Recycled Polystyrene into the Enhanced EV Styrenic Resin

In addition to, or in lieu of the additives mentioned above, the enhanced EV styrenic resins may be produced in the presence of one or more recycled materials, such as a post-consumer recycle (PCR) polystyrene. "Post-consumer recycle" (PCR) polystyrene, as used herein, refers to a styrenic resin (e.g., GPPS, HIPS), obtained as a raw or processed styrenic material that has been previously incorporated into one or more consumer products. The PCR polystyrene may therefore consist entirely or essentially of styrenic polymers or may include styrenic polymers and other materials that affect the properties (e.g., appearance, performance, processability) of the styrenic material. As noted above, the other materials may include consumer waste, metallic objects (e.g., conductors, wire hangers), and other polymeric materials commonly associated with polystyrene in consumer products. By way of non-limiting example, such other polymeric materials may include any one or a combination of polyolefins (e.g., polyethylene, polypropylene), polyacrylates (e.g., polyacrylonitrile), polyconjugated dienes (e.g., polybutadiene), polyvinyl halides (e.g., polyvinylchloride) and the like. Other polymers and materials typically associated with styrenic polymers in consumer products will be readily apparent to those of ordinary skill in the art and are within the scope of the present disclosure. By way of non-limiting example, while any source of PCR polystyrene is presently contemplated, it may be desirable to utilize a source of PCR polystyrene that has had limited to no contact with materials that may be undesirable for subsequent food contact applications, such as beverage containers, food trays, and the like. One example source of PCR polystyrene is NEXTLIFE RECYCLING SUSTAINABLE POLYSTYRENE® PC polystyrene, which is commercially available from NextLife Recycling, LLC of Boca Raton, Fla.

Generally, the PCR polystyrene may be dissolved in the monovinylarene monomer and may be provided as a feed to the polymerization process. In certain configurations, the resulting mixture may be filtered to remove undissolved materials (e.g., undissolved metals, polymers, consumer waste). Indeed, the monovinylarene monomer used according to the present disclosure may, in certain embodiments, be provided to the polymerization process in this manner. Example methods for producing such a feed and performing subsequent polymerization on the feed are discussed in U.S. patent application Ser. No. 13/571,152, now U.S. Pat. No. 8,609,778, entitled Styrenic Resin Incorporating Recycled Polystyrene, filed on Aug. 9, 2012, which is incorporated by reference herein in its entirety. A styrenic resin produced according to such a technique may be considered to be an "in-reactor" produced recycled resin.

It should be appreciated that PCR polystyrene resins (i.e., the raw PCR polystyrene) will typically have relatively poor physical properties (e.g., relatively low Mw, Mn, Mz, Mz+1) and high MFR values due to a relatively high number of heat histories and high shear exposure. Accordingly, in embodiments where the styrenic resins of the present disclosure are produced in the presence of, and therefore incorporate, the PCR polystyrene (i.e., to produce an in-reactor produced recycle resin), its EV, Mz+1, and MFR values will all be affected. For example, an in-reactor produced recycle resin produced according to such a technique may have between approximately 10 weight percent and 50 weight percent PCR polystyrene, with the remainder of the in-reactor produced recycle resin being the virgin enhanced EV styrenic resin and any additives incorporated therein. Generally, as the level of PCR polystyrene incorporated into the in-reactor produced recycle resin increases, the resulting EV and Mz+1 will decrease and the MFR will increase.

By way of non-limiting example, an in-reactor produced recycle resin produced in accordance with the present disclosure may have between approximately 10 weight percent and 25 weight percent PCR polystyrene. In such an embodiment, the in-reactor produced recycle resin has an extensional viscosity of at least approximately 293,000 Pa-sec, such as between approximately 293,000 Pa-sec and approximately 355,000 Pa-sec. Such an in-reactor produced recycle resin may have a MFR of less than approximately 2.3 g/10 min, such as between approximately 1.3 g/10 min and 2.2 g/10 min.

In another example, an in-reactor produced recycle resin produced in accordance with the present disclosure may have between approximately 25 weight percent and 50 weight percent PCR polystyrene. In such an embodiment, the in-reactor produced recycle resin has an extensional viscosity of at least approximately 245,000 Pa-sec, such as between approximately 245,000 Pa-sec and 293,000 Pa-sec. Such an in-reactor produced recycle resin may have a MFR of less than approximately 5.0 g/10 min, such as between approximately 1.8 g/10 min and 4.5 g/10 min.

IV. Compositions Made Using the Enhanced EV Styrenic Resin

As noted above, the enhanced EV styrenic resins produced in accordance with the present disclosure may have a relatively high EV when compared with typical styrenic resins. Indeed, as discussed in detail below, the enhanced EV styrenic resins of the present disclosure may be utilized in combination with a variety of materials while still maintaining desired levels of performance and processability. For example, in addition to, or in lieu of incorporating materials into the polymerization process used to produce the enhanced EV styrenic resin, the present styrenic resins may be utilized in a composition along with post-consumer recycle (PCR) polystyrene, rubber-modified polystyrene (i.e., HIPS resins), and/or various other additives such as plasticizers, colorants, and so forth.

Certain such compositions may include the enhanced EV styrenic resin in any amount, such as between approximately 0.1 weight percent and 99.9 weight percent, based on the total weight of the composition. In certain embodiments, the enhanced EV styrenic resin may be compounded with additives including any one or a combination of plasticizers (e.g. mineral oil), flow promoters, lubricants, antioxidants, initiators, mold release agents, or color enhancers. The particular additives that are compounded with the enhanced EV styrenic resin, as well as their respective amounts, will be readily apparent to those of ordinary skill in the art and are within the scope of the present disclosure. For example, plasticizers may be compounded with the enhanced EV styrenic resin to increase the MFR of the resin so as to obtain a desired MFR. However, increasing the MFR in this manner may also result in a reduction of the EV of the resin.

In addition to, or in lieu of, compounding the enhanced EV styrenic resin with such additives, the enhanced EV styrenic resin may be compounded with a PCR polystyrene. Generally, the enhanced EV styrenic resin and the PCR polystyrene (and any other additives) may be compounded in any relative amounts. For example, between approximately 1 weight percent and 99 weight percent of a composition may be the PCR polystyrene, with the remainder being an enhanced EV styrenic resin and any other additives that may be desired. By way of non-limiting example, in some embodiments, the composition may include between approximately 10 weight percent and 50 weight percent PCR polystyrene.

As noted above, typical PCR polystyrenes will have relatively high MFR values and relatively low Mz+1 and concomitantly low EVs. Thus, when the PCR polystyrene is compounded with an enhanced EV styrenic resin, the resulting composition will have an EV that is lower than the enhanced EV styrenic resin but higher than the PCR polystyrene. For example, in embodiments where the PCR polystyrene is present in an amount between approximately 10 weight percent and 25 weight percent and the enhanced EV styrenic resin is present in an amount between approximately 75 weight percent and 90 weight percent, the composition may have an extensional viscosity of at least approximately 280,000 Pa-sec. For example, the extensional viscosity may be between approximately 280,000 Pa-sec and 350,000 Pa-sec, or between approximately 290,000 Pa-sec and 340,000 Pa-sec.

As another example, in embodiments where the PCR polystyrene is present in an amount between approximately 25 weight percent and 50 weight percent and the enhanced EV styrenic resin is present in an amount between approximately 50 weight percent and 75 weight percent, the composition may have an extensional viscosity of at least approximately 219,000 Pa-sec. For example, the extensional viscosity may be between approximately 219,000 Pa-sec and 280,000 Pa-sec, or between approximately 230,000 Pa-sec and 270,000 Pa-sec.

In addition to or in lieu of the materials set forth above, the enhanced EV styrenic resin may be compounded with other styrenic resins, including but not limited to rubber-modified styrenic resins (i.e., HIPS resins) and/or GPPS resins. Additionally or alternatively, the enhanced EV styrenic resin may be compounded with other polymeric resins. Such resins may include but are not limited to acrylonitrile-butadiene-styrene (ABS) polymers, polyacrylates, polymers of conjugated dienes, polyolefins, polyvinylhalides, or the like. Additionally or alternatively, the enhanced EV styrenic resin may be compounded with certain resins having a relatively increased number of heat histories and an increased number of high shear exposures, such as process regrind or other post-manufacturing recycled materials.

V. Applications and End Uses of the Enhanced EV Styrenic Resin

In general, the enhanced EV styrenic resin or composition having the enhanced EV styrenic resin, after production, may be transported to customers and/or subsequently processed to form various articles of manufacture. Indeed, any number of processes may be performed on the enhanced EV styrenic resin or composition to produce the articles, including foam sheet extrusion, foam board extrusion, extrusion and thermoforming, blown or cast film, injection molding and similar processes.

For example, a foaming mixture may be produced from the enhanced EV styrenic resin or composition and a blowing agent. The foaming mixture is typically heated and/or subjected to a reduced pressure to release the blowing agent to produce a foamed styrenic resin. The foamed styrenic resin may be subsequently extruded into a sheet and thermoformed to produce a foamed article, or may be extruded into a board (typically thicker than a sheet) and used as foam insulation or the like.

Such processes may benefit from the enhanced EV of the present styrenic resin by producing foamed articles with a lower open cell content. In addition, higher levels of in-plant regrind (e.g., from trimmings after thermoforming the article) may be incorporated into an extrusion line to produce articles without undesirable levels of brittleness. Enhanced EV levels of the present styrenic resins may also enable higher levels of cell orientation in a foamed sheet or board, resulting in enhanced ductility of the foam. The sidewall distribution in the thermoformed article may also be improved, resulting in enhanced flexibility and increased toughness.

In embodiments where the enhanced EV styrenic resin is produced by a suspension polymerization process, the process may produce pellets or granules of the enhanced EV styrenic resin. In such embodiments, the pellets or granules may be expanded (e.g., with air, steam, or another gas) and subsequently molded to produce an article.

In still other processes, the enhanced EV styrenic resin may be extruded to produce a film or sheet. The extruded film or sheet may be blown or cast to produce a blown or cast film, which may then be rolled or thermoformed to produce a shaped article. The shaped article, in some embodiments may be trimmed to produce the article. In certain embodiments, the PCR styrenic resin may have properties so as to enable the trimmings from such a process to be re-ground, re-extruded, and subsequently incorporated into an article. As with foam applications, the enhanced EV of the present styrenic resins may enable improved sidewall distribution and higher levels of in-plant regrind in such processes.

In view of the foregoing, it will be appreciated that the enhanced EV styrenic resin or composition can be used to make a wide variety of articles of manufacture, including but not limited to telephones, house wares, refrigerator parts, lawn and garden tools, kitchen appliances, electronics housings, toys, window pieces, packaging articles, food packaging and food service articles, beverage containers, medical parts or devices, foam insulation, foam beverage containers, foam coolers, and the like. Such articles may be ultimately used by consumers.

It is therefore also presently contemplated that the enhanced properties of the present styrenic resins may also enable its subsequent use as a recycled material. For example, because of their large population of relatively long styrenic polymer chains, the enhanced EV styrenic resins of the present disclosure may withstand a relatively higher number of heat histories and exposures to high shear (e.g., during extrusion and thermoforming processes) compared to typical resins. Accordingly, the enhanced EV styrenic resins of the present disclosure may, in certain embodiments, be formed into an article, used by a consumer, re-collected, and re-processed to generate a source of PCR polystyrene. In such embodiments, it is presently contemplated that the PCR polystyrene produced from the enhanced EV styrenic resin may be incorporated in relatively high amounts (e.g., greater than approximately 25 weight percent, greater than approximately 50 weight percent, greater than approximately 70 weight percent) while producing a resin having desired performance (e.g., strength, flexibility) and processability for producing subsequent articles of manufacture.

EXAMPLES

The following real examples are set forth to provide those of ordinary skill in the art with a detailed description of how the techniques discussed herein may be implemented, and are not intended to limit the scope of the present disclosure.

The following general purpose polystyrene (GPPS) examples were prepared using a continuous stirred tank reactor (CSTR) with the temperature set points ranging between approximately 130° C. and 150° C. A feed rate of 23,000 lb/hr (approximately 10,400 kg/hr) with a residence time of approximately 2 hr, and an agitation rate in the reactors of between approximately 50 rotations per minute (rpm) and 70 rpm was utilized. The feed included ethylbenzene as solvent and (1,1 di(t-butylperoxy)cyclohexane) difunctional organic peroxide initiator in the amounts set forth in the table. It should be noted that modifications were made to the polymerization process from the baseline resin of Example 1 to the enhanced EV resins of Examples 2-5. These modifications included a reduction in temperature as well as an increase in concentration of the reaction components. The particular differences, the particular amounts utilized for the polymerization processes, and the resulting processes are set forth in Table 1 below.

The following test methods were employed to determine certain of the physical and analytical properties of the comparative and enhanced EV styrenic resins. Melt flow rate (MFR) was measured using a Tinius Olson Extrusion Plastometer Melt Flow Measurement Apparatus, Model MP993, according to the test procedure ASTM D-1238-10 at 200° C. using a 5 kilogram (kg) load. Molecular weight calculations for the resins, including weight average molecular weight, Mw, number average molecular weight, Mn, Z-average molecular weight, Mz, and Z+1 average molecular weight, Mz+1, were determined by the gel permeation chromatographic techniques using an HP Agilent 1100™ HPLC and tetrahydrofuran (THF) as mobile phase. Extensional viscosity measurements were conducted using an ARES G-2® rheometer with an extensional viscosity fixture. Compression molded samples were prepared with a thickness of 0.7 mm, a width of 10 mm and a length of 18 mm. The compression molded samples were tested at a temperature of 172° C. The extension rate was 10 sec$^{-1}$, and extensional viscosity data was recorded at 0.3 seconds.

TABLE 1

Comparison Between Process Parameters and Properties of Enhanced Extensional Viscosity Styrenic Resins

| | Example No. | | | | |
| --- | --- | --- | --- | --- | --- |
| | Example 1-Baseline | Example 2 | Example 3 | Example 4 | Example 5 |
| Composition | | | | | |
| Ethyl benzene (% of feed) | 5.25 | 4.25 | 4.25 | 4 | 3.9 |
| Initiator, ppm | 275 | 275 | 275 | 275 | 275 |
| Reactor Conditions | | | | | |
| Reactor temperature, ° C. | 134.5 | 133.5 | 133 | 133 | 133 |
| Properties | | | | | |
| MFR, g/10 min | 1.32 | 1.15 | 1.08 | 1.12 | 1.13 |
| Mw (a.m.u.) | 301,000 | 321,000 | 324,000 | 331,000 | 326,000 |
| Mn | 119,000 | 130,000 | 131,000 | 133,000 | 131,000 |
| Mz | 501,000 | 535,000 | 538,000 | 548,000 | 539,000 |
| Mz + 1 | 710,000 | 760,000 | 761,000 | 772,000 | 758,000 |
| Extensional Viscosity, Pa-sec | 330,000 | 391,000 | 393,000 | 401,000 | 385,000 |

As readily apparent from the data in Table 1, the enhanced EV styrenic resins of the present disclosure (Examples 2-5) exhibit significantly higher extensional viscosity than the baseline styrenic resin (Example 1). The Mz+1 and EV data is graphically represented in FIG. 1.

It will be appreciated, in comparing the graph in FIG. 1 and the numerical data of Examples 2-5 with Example 1, the extensional viscosities of Examples 2-5 are more than 15% higher. Surprisingly, comparing Example 1 (i.e., the baseline resin) and Example 5 (the enhanced EV styrenic resin with the lowest Mz+1 and EV), an increase in the Mz+1 of only approximately 6.8% results in an improvement in EV of nearly 2.5 times the change in Mz+1 value. Also of interest is that the MFR was not significantly reduced. Comparing Example 1 with Example 5, the MFR was reduced by less than about 15%. Accordingly, a substantial increase in EV is realized with only modest increases in Mz+1, while maintaining adequate processability.

The specific embodiments described above have been shown by way of example, and it should be understood that these embodiments may be susceptible to various modifications and alternative forms, and can also be used in any appropriate combination. It should be further understood that the claims are not intended to be limited to the particular forms disclosed, but rather to cover all modifications, equivalents, and alternatives falling within the spirit and scope of this disclosure.

What is claimed is:

1. A styrenic resin consisting essentially of linear polymer chains produced from monovinylarene monomer and having an Mz+1 molecular weight of between approximately 750,000 and 820,000 as measured by gel permeation chromatography (GPC) and an extensional viscosity between approximately 360,000 Pascal-seconds (Pa-sec) and 450,000 Pa-sec when measured on an extensional rheometer at a temperature of approximately 172° C. and an extension rate of 10 sec$^{-1}$ measured at 0.3 seconds.

2. The styrenic resin of claim 1, wherein the styrenic resin has a melt flow rate (MFR) of less than approximately 1.7 g/10 min per ASTM D-1238-10.

3. The styrenic resin of claim 1, wherein the styrenic resin has a MFR of between approximately 1.7 and 0.5 g/10 min per ASTM D-1238-10.

4. The styrenic resin of claim 1, wherein the extensional viscosity of the styrenic resin is between approximately 370,000 Pa-sec and 440,000 Pa-sec when measured on an extensional rheometer at a temperature of approximately 172° C. and an extension rate of 10 sec$^{-1}$ measured at 0.3 seconds.

5. The styrenic resin of claim 1, wherein the extensional viscosity of the styrenic resin is between approximately 380,000 Pa-sec and 430,000 Pa-sec when measured on an extensional rheometer at a temperature of approximately 172° C. and an extension rate of 10 sec$^{-1}$ measured at 0.3 seconds.

6. The styrenic resin of claim 1, wherein the Mz+1 of the styrenic resin is between approximately 760,000 and 810,000.

7. The styrenic resin of claim 1, wherein the styrenic resin consists essentially of polystyrene.

8. The styrenic resin of claim 1, wherein the styrenic resin is produced by free-radical initiated solution or bulk polymerization.

9. The styrenic resin of claim 1, wherein the styrenic resin has a melt flow rate (MFR) between approximately 1.0 g/10 min and 1.2 g/10 min per ASTM D-1238-10.

10. A general purpose polystyrene (GPPS) having an Mz+1 molecular weight between approximately 750,000 and 820,000 as measured by gel permeation chromatography (GPC), wherein the extensional viscosity of the GPPS is between approximately 380,000 Pascal-seconds (Pa-sec) and 430,000 Pa-sec when measured on an extensional rheometer at a temperature of approximately 172° C. and an extension rate of 10 sec$^{-1}$ measured at 0.3 seconds.

11. A styrenic resin consisting essentially of linear polymer chains produced from styrene monomer and having an Mz+1 molecular weight between approximately 760,000 and 810,000 as measured by gel permeation chromatography (GPC) and an extensional viscosity between approximately 380,000 Pascal-seconds (Pa-sec) and 430,000 Pa-sec when measured on an extensional rheometer at a temperature of approximately 172° C. and an extension rate of 10 sec$^{-1}$ measured at 0.3 seconds.

12. The styrenic resin of claim 11, wherein the styrenic resin is produced by a free-radical polymerization process in which the Mz+1 molecular weight is increased relative to a baseline Mz+1 value, and the extensional viscosity is improved relative to a baseline extensional viscosity value by approximately 2.5 times the change in the Mz+1 value.

13. The styrenic resin of claim 11, wherein the styrenic resin has a melt flow rate (MFR) between approximately 1.0 g/10 min and 1.2 g/10 min per ASTM D-1238-10.

14. The styrenic resin of claim 1, wherein the styrenic resin is a monovinylarene homopolymer.

* * * * *